(12) United States Patent
Mandecki et al.

(10) Patent No.: US 10,099,196 B2
(45) Date of Patent: Oct. 16, 2018

(54) GENOMIC-SCALED NUCLEIC ACID SYNTHESIS, AND OTHER COMBINATORIAL SYNTHESES

(71) Applicant: PharmaSeq, Inc., Monmouth Junction, NJ (US)

(72) Inventors: Wlodek Mandecki, Princeton Junction, NJ (US); Efrain "Frank" Rodriguez, Bordentown, NJ (US); Ziye "Jay" Qian, Monroe Township, NJ (US)

(73) Assignee: PharmaSeq, Inc., Monmouth Junction ( * ) Notice: Subject to any disclaimer, the term of this patent is extended or adjusted under 35 U.S.C. 154(b) by 300 days.

(21) Appl. No.: 14/972,659

(22) Filed: Dec. 17, 2015

(65) Prior Publication Data

US 2016/0175801 A1    Jun. 23, 2016

Related U.S. Application Data

(60) Provisional application No. 62/093,819, filed on Dec. 18, 2014.

(51) Int. Cl.
| | | |
|---|---|---|
| *C40B 20/04* | (2006.01) | |
| *B01J 19/00* | (2006.01) | |
| *C40B 50/16* | (2006.01) | |
| *C40B 60/14* | (2006.01) | |
| *C40B 70/00* | (2006.01) | |

(52) U.S. Cl.
CPC .......... *B01J 19/0046* (2013.01); *C40B 20/04* (2013.01); *C40B 50/16* (2013.01); *C40B 60/14* (2013.01); *C40B 70/00* (2013.01); *B01J 2219/00306* (2013.01); *B01J 2219/00531* (2013.01); *B01J 2219/00567* (2013.01); *B01J 2219/00587* (2013.01); *B01J 2219/00596* (2013.01); *B01J 2219/00675* (2013.01); *B01J 2219/00689* (2013.01); *B01J 2219/00704* (2013.01); *B01J 2219/00722* (2013.01); *B01J 2219/00725* (2013.01)

(58) Field of Classification Search
None
See application file for complete search history.

(56) References Cited

U.S. PATENT DOCUMENTS

| | | |
|---|---|---|
| 7,098,394 B2 | 8/2006 | Armer et al. |
| 8,785,352 B2 | 7/2014 | Mandecki et al. |
| 2014/0106470 A1 | 4/2014 | Kopacka et al. |

OTHER PUBLICATIONS

U.S. Appl. No. 14/631,321, filed Feb. 25, 2015.

*Primary Examiner* — Christopher M Gross

(57) ABSTRACT

Provided is a method of synthesis comprising: (I) providing separate reaction sequences to TABs; (II) utilizing reaction vessels configured to react a separate combinatorial building block with a moiety on a surface of a TAB; and (III) operating one or more TAB sorters comprising a TAB reader, a sorting tree comprising valves or switches and sorting nodes, and a monitor configured to detect TAB location, wherein the operating comprises serially conducting: (a) reacting distinct combinatorial building blocks in the reaction chambers with surfaces of TABs distributed in the reaction chambers; (b) operating a controller to operate the TAB sorters to segregate the TABs to allocations appropriate for the next assigned reaction, the operating including recycling TABs with ambiguous identity back through the sorter; and (c) repeating steps (a) and (b) as needed to complete 30% or more of the assigned sequences.

22 Claims, 9 Drawing Sheets

GENOMIC-SCALED NUCLEIC ACID SYNTHESIS, AND OTHER COMBINATORIAL SYNTHESES

This application claims the priority of U.S. Provisional Patent Application Ser. No. 62/093,819, filed Dec. 18, 2014, which is hereby incorporated in its entirety.

Provided is an combinatorial synthesizer utilizing a sorter for small, specifically identifiable items (TABs), the sorter, and methods of combinatorial synthesis.

To synthesize a complete or near complete set of oligonucleotides representing a genome of a relatively complex organism, the cost of production with current technology can be brought down to 10¢ per base. If the genome size is 3 billion base pairs, oligonucleotides representing nearly 3 billion bases are needed (assuming for the sake of argument that certain segments are too repetitive and therefore not worth modeling). Thus, the cost would be near $300,000,000. If the cost can be brought down by 4 or 5 orders of magnitude, it would be lowered to $3,000 to $30,000.

In principle, such a low cost process might be done with 4 reaction chambers (more if nucleotide analogs are used) and small synthesis support structures that can be quickly and accurately sorted. After one round of synthesis in the separate chambers, the support structures can be sorted for distribution once again in the reaction chambers. If, for example, support structure # "0045067" is to have the initial structure AGAACTG (3' to 5'), then the first reaction is conducted in an adenosine chamber. After the first reaction, this support structure and any other intended to receive G as the second base is sorted for reaction in the guanosine chamber.

In this fashion, the sequence for each support structure can be pre-ordained, and quick and accurate sorting can make that defined sequence diversity practical.

One tool that might have been considered for the support structure is a very small, light-triggered microtransponder ("MTP" or "p-Chip" microtransponder), such as described in U.S. Pat. No. 7,098,394 (incorporated herein by reference in its entirety). These are available to provide identifiers, for example as identifiers for each support structure. Since the surfaces can be modified to support nucleic acid synthesis, such as for example is described in U.S. Pat. No. 8,785,352 (incorporated herein by reference), the MTPs can be the support structures. These MTPs typically have two major surfaces, one of which has the photosensitive elements. Synthesis reactions can be conducted on both major surfaces, or indeed on all surfaces including edges. MTPs have proven to be stable under a wide variety of conditions.

With MTPs, each support structure is identifiable. "TABs" are structures having size less than or equal to about 0.03 mm$^3$ and specifically identifiable. For example, these can be semiconductor slabs with bar-code (2-D or 3-D) structures etched thereon. Given TABs and sorters, the questions then turn to how fast they can be sorted, and how accurately.

Cell sorter technology can in principle be applied to sort TABs. But, in cell sorting the achieved and useful accuracy is much less than needed to make genome-scaled synthesis useful. High accuracy cell sorting can exhibit a 1% error rate. The resulting cell pools consist of 99% of the target cell type, and 1% other. In synthesizing 100 base pairs in the proposed method, 100 sortings are needed, such that with such accuracy the chance of a sequence error for a given support structure nears a certainty.

Described herein are sorters that can achieve the needed accuracies, with the required accuracy and speed, and a device and method for making oligonucleotides representing for example 10$^7$ base pairs.

The resulting TAB supports can be used in hybridization studies, such as studies searching for genetic variation between subjects or between species. Such hybridization studies with the resulting TAB supports can utilize pooled hybridization reactions, and analysis by sorting, such as with the Simuplex reader available from PharmaSeq (Monmouth Jcn., N.J.), or the "Cyclone" analyzer described in U.S. Pat. No. 9,939,379 filed 15 Oct. 2013 (incorporated herein by reference in its entirety). Using PCR replication methods, the resulting nucleic acids can be used to create large double stranded nucleic acid sequences.

Much the same structure can be used to rationally create protein or polypeptide sequence diversity, or other chemical diversity.

SUMMARY

Provided among other things is a combinatorial synthesizer comprising: (A) four or more reaction vessels configured to react a separate combinatorial building block with a moiety on a surface of a TAB; (B) one or more TAB sorters comprising a TAB reader, a sorting tree comprising valves or switches and sorting nodes, wherein the TAB sorter sorts to outlets that number more than the number of reaction vessels, and a monitor configured to detect TAB location or proximity (such as for example when TABs enter the sorting nodes), wherein the TAB reader is configured to read TABs in the TAB sorter (such as for example prior to a TAB entering the sorting tree), wherein the TAB sorter has outlets at least matching the number of reaction chambers plus one; (C) one or more RCY sorting chambers for ambiguously ID'd TABs, such chambers configured to receive such TABs from one or more outlets of the TAB sorter, with a given RCY sorting chamber configured to direct ambiguously ID'd TABs back to an inlet of a said TAB sorter; and (D) a controller (i) programmable to track an assigned separate reaction sequences for 10$^4$ or more TABs, (ii) operatively connected to receive ID data from the TAB reader, (iii) operatively connected to the valves or switches to sort the TAB consistent with the TAB's ID, (iv) operatively connected to receive TAB location data from the monitor, (v) configured to identify TAB's with ambiguous IDs, (vi) configured to operate the valves or switches of the TAB sorter to direct such ambiguously ID'd TABs to a said RCY sorting chamber, and (vii) configured to operate the valves or switches of the TAB sorter to direct an ID'd TAB to a TAB sorter outlet appropriate for its assigned reaction sequence, wherein the combinatorial synthesizer is configured to direct via the outlets the TABs to the reaction chamber appropriate for the next reaction in the TAB's assigned reaction sequence.

Further provided is method of combinatorial synthesis comprising: (I) assigning or providing separate reaction sequences for 10$^4$ or more TABs; (II) utilizing four or more reaction vessels configured to react a separate combinatorial building block with a moiety on a surface of a TAB; and (III) operating one or more TAB sorters comprising a TAB reader, a sorting tree comprising valves or switches and sorting nodes, wherein the TAB sorter sorts to outlets that number more than the number of reaction vessels, and a monitor configured to detect TAB location (such as for example when TABs enter the sorting nodes), wherein the TAB reader is configured to read a TAB in the TAB sorter (such as for example when entering the tope of the sorting tree), wherein the operating comprises serially conducting: (a) reacting four distinct combinatorial building blocks in the reaction chambers with surfaces of $10^4$ or more TABs distributed in the reaction chambers; (b) operating a controller to operate the TAB sorters to segregate the TABs to allocations appropriate for the next assigned reaction, the operating including recycling TABs with ambiguous identity back through the sorter; and (c) repeating steps (a) and (b) as needed to complete 30% or more of the assigned sequences. In embodiments, 40% or more, or 50% or more, or 60% or more, or 70% or more, or 80% or more, or 90% or more, or 95% or more of the assigned sequences are completed.

Provided is a method of double stranded nucleic acid synthesis comprising: synthesizing overlapping oligonucleotides defining the sequence of the double stranded nucleic acid with the method of described above; removing the overlapping oligonucleotides from the TABs; and annealing the overlapping oligonucleotides and enzymatically filling in resulting single-stranded regions.

Also provided is a sorter comprising: (A) one or more TAB sorters comprising a TAB reader, a sorting tree comprising valves or switches and sorting nodes, wherein the TAB sorter sorts to outlets that number five or more, of which four or more are separate sorting outlets, and a monitor configured to detect TAB location, wherein the TAB reader is configured to read a TAB in the TAB sorter; (B) one or more RCY sorting chambers for ambiguously ID'd TABs, such chambers configured to receive such TABs from one or more outlets of the TAB sorter, with a given RCY sorting chamber configured to direct ambiguously ID'd TABs back to an inlet of a said TAB sorter; and (C) a controller (i) programmable to track sorting requirements for $10^4$ or more TABs, (ii) operatively connected to receive ID data from the TAB reader, (iii) operatively connected to the valves or switches to sort the TAB consistent with the TAB's ID, (iv) operatively connected to receive TAB location data from the monitor, (v) configured to identify TAB's with ambiguous IDs, (vi) configured to operate the valves or switches of the TAB sorter to direct such ambiguously ID'd TABs to a said RCY sorting chamber, and (vii) configured to operate the valves or switches of the TAB sorter to direct an ID'd TAB to a sorting outlet appropriate for its ID.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings present only illustrative embodiments of this invention and are therefore not to be considered limiting of its scope, for the invention may admit to other equally effective embodiments.

Figure 1:
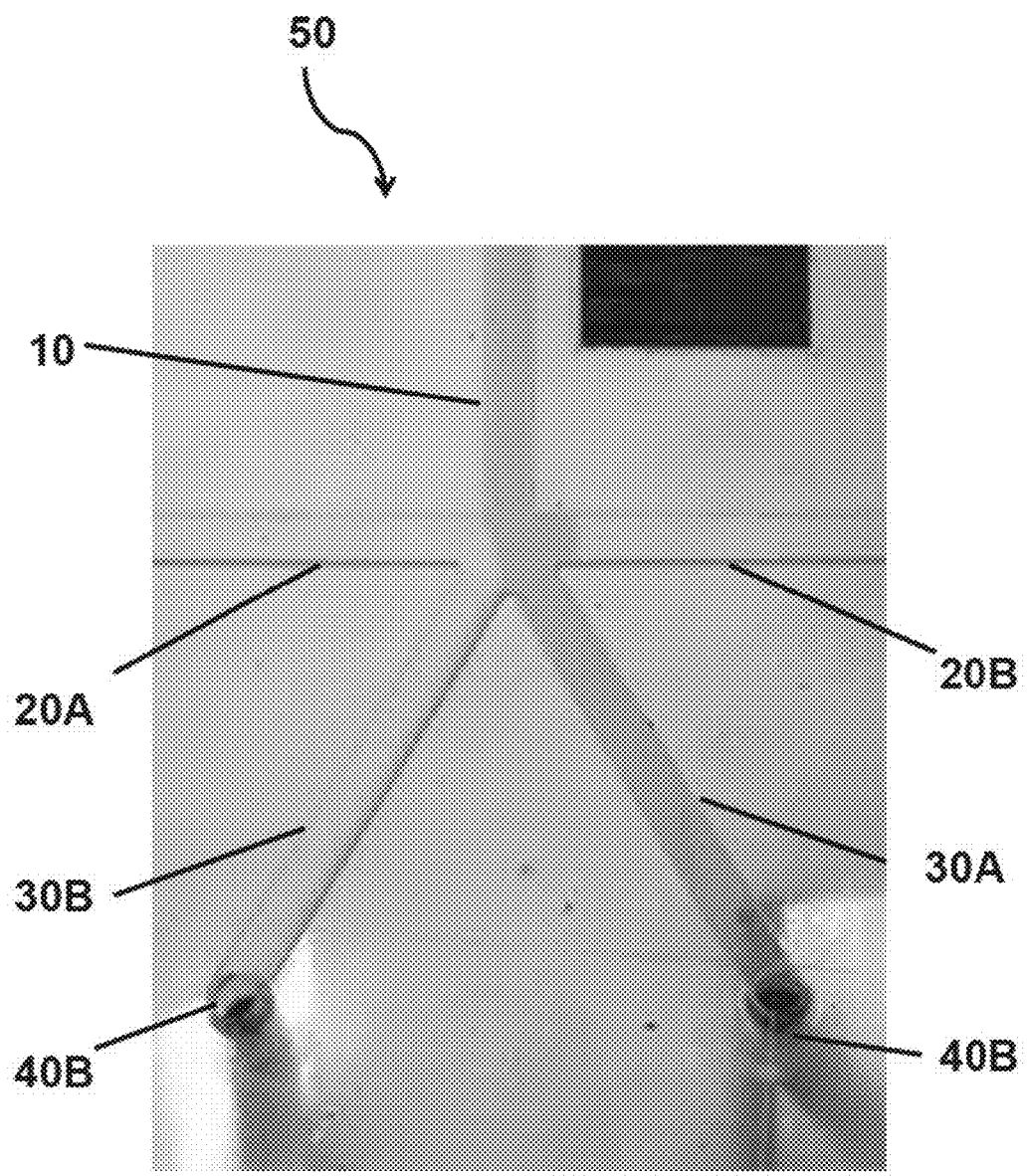
FIG. 1 shows an exemplary sorting node.

To facilitate understanding, identical reference numerals have been used, where possible, to designate comparable elements that are common to the figures. The figures are not drawn to scale and may be simplified for clarity. It is contemplated that elements and features of one embodiment may be beneficially incorporated in other embodiments without further recitation.

DETAILED DESCRIPTION

TAB Sorter

A TAB generally has a length, width and height. In certain embodiments, a TAB is a MTP. A planar TAB is one where the height is 50% or less than the smallest of the length or width. The height of a TAB is no more than one of these dimensions (length and width). In some embodiments, the height is 40% or less, 35% or less, 30% or less, 25% or less, or 20% or less, than the smallest of the length or width. TABs used in the invention are often, but not necessarily, square or rectangular (with respect to length and width), consistent with a focus on low cost of production. A particularly useful TAB is one where the longest of the length or width is about 0.6 mm or less. In some embodiment, the longest of the length or width is about 0.5 mm or less, or about 0.4 mm or less, or about 0.3 mm or less, or about 0.2 mm or less, or about 0.1 mm or less, or about 0.05 mm or less. In one embodiment, the microchip is 600 micron (micrometer)×600 micron×100 or 120 micron.

By way of illustration, FIG. 1 shows a single-tiered sorter, or sorting node (selector) 50 (which can be termed a "manifold"). In the illustrated layer there is a source channel 10 (from which fluid with TABs would travel), selector sources 20A and 20B, selection channels 30A and 30B, and layer junction channels 40A and 40B. Fluid flow can be effected with valving and pressurized source solvent (e.g., $N_2$ pressure), pumping (including electroosmotic pumping), and the like.

Channels in the sorter can be, for example 1 mm×1 mm for use with 600×600×100 micron TABs, or for example 100 micron×100 micron for 50×50×10 micron TABs.

A small flow or pressure from selector source 20A directs flow from the source channel 10 to selection channel 30A. This is illustrated in the figure by the colored solvent (providing a darker image in the respective channels). Sector source 20B can be operated to direct flow to selection channel 30B. Junction channels 40A and 40B illustrate a feature often used in the microfluidics of a TAB sorter. The channels described above are illustrated as formed (e.g., etched) in one layer of material. Channels can be further connected by linking vertically to channels in additional layers, or tubing external to the layers having the sorter channels, such as with the illustrated vertical channels of junction channels 40A and 40B.

Valving can be in such separate layers, or separate from the layers having the sorter channels. Valves can be for example solenoid based such as the Parker Hannifin series 9 pulse valves, or similar units from TLX Technologies and SMC Corporation of America (Noblesville, Ind.). Piezoelectric valves for example can similarly be used with appropriate driving circuits.

Other sorting mechanisms can be used, such as electrostatic, magnetic, or pneumatic.

In a TAB sorter sorting nodes are generally but not necessarily binary, as illustrated in FIG. 1. Thus, sorting into multiple sorting chambers generally involves staging binary separations in a tree-like structure. Sorting outputs from multiple pathways can be re-united. A given branch of the sorting tree can be shorter than another. A TAB sorter can have sorting pathways formed in a single solid structure (e.g., which can be formed by uniting multiple etched layers), or can have modules linked by tubing.

Figure 2:
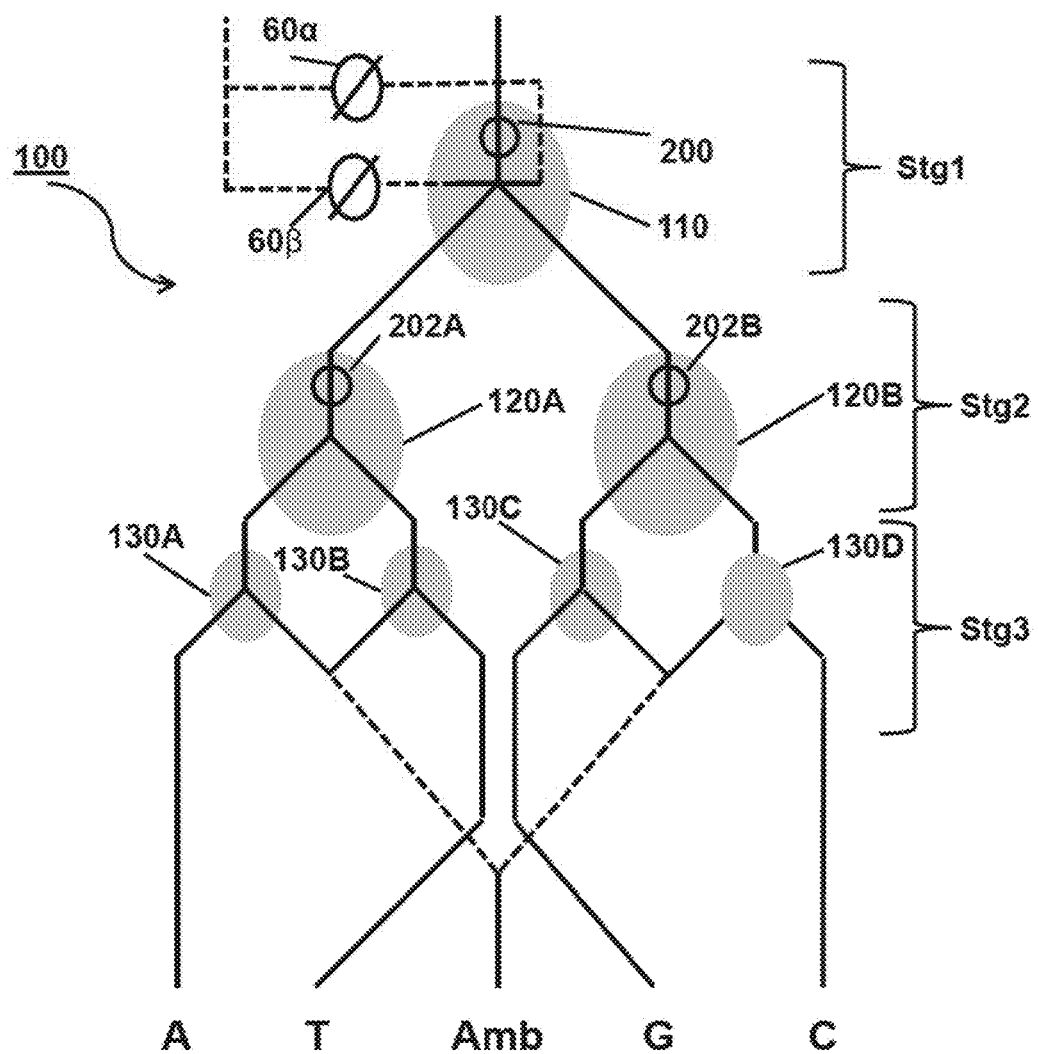
FIG. 2 shows an exemplary design of the sorting manifold (TAB sorter) wherein the chips are sorted through to the appropriate collection vessels as designated for the next step in the synthesis process. A path for unsorted chips to be presented for the next iteration of sorting is presented as "Amb". This manifold includes a reading location 200.

Illustrated schematically in FIG. 2 is TAB sorter 100. The grey highlights 110, 120A, 120B, 130A, 130B, 130C and 130D are binary sorting nodes. For illustration purposes, the illustrative selector sources are only shown for binary sorting node 110. The dotted lines represent connectors to another layer of material or external. Valves 60α and 60β control which selector source (20A or 20B) is operative.

Labels Stg 1, Stg 2 and Stg 3 indicate the three consecutive stages of the illustrative TAB sorter. Outputs are to sorting chambers A, T, G, C (these designations are for intuitive convenience of modeling the general invention on nucleic acid synthesis) and Rcy. The "RCY" Sorting chamber Rcy is for TABs for which a controller 500 determined during sorting that identity was less clear (e.g. TABs too close together, or were not read by the TAB reader), such that generally recycling is needed. In embodiments of the invention, these TABs are re-sorted. The sorting chambers can be reaction chambers, provided that TABs are staged outside of the reaction chambers as needed to immediately re-use them after sorting.

The population of TABs in a given sort chamber can be confirmed for example using the "Cyclone" analyzer described in U.S. patent application Ser. No. 14/053,938, which can be operated to inventory collections of TABs. This can be done for example in conjunction with calibrating the cutoffs, for example for when TABs are too close to allow unambiguous identification.

Figure 3:
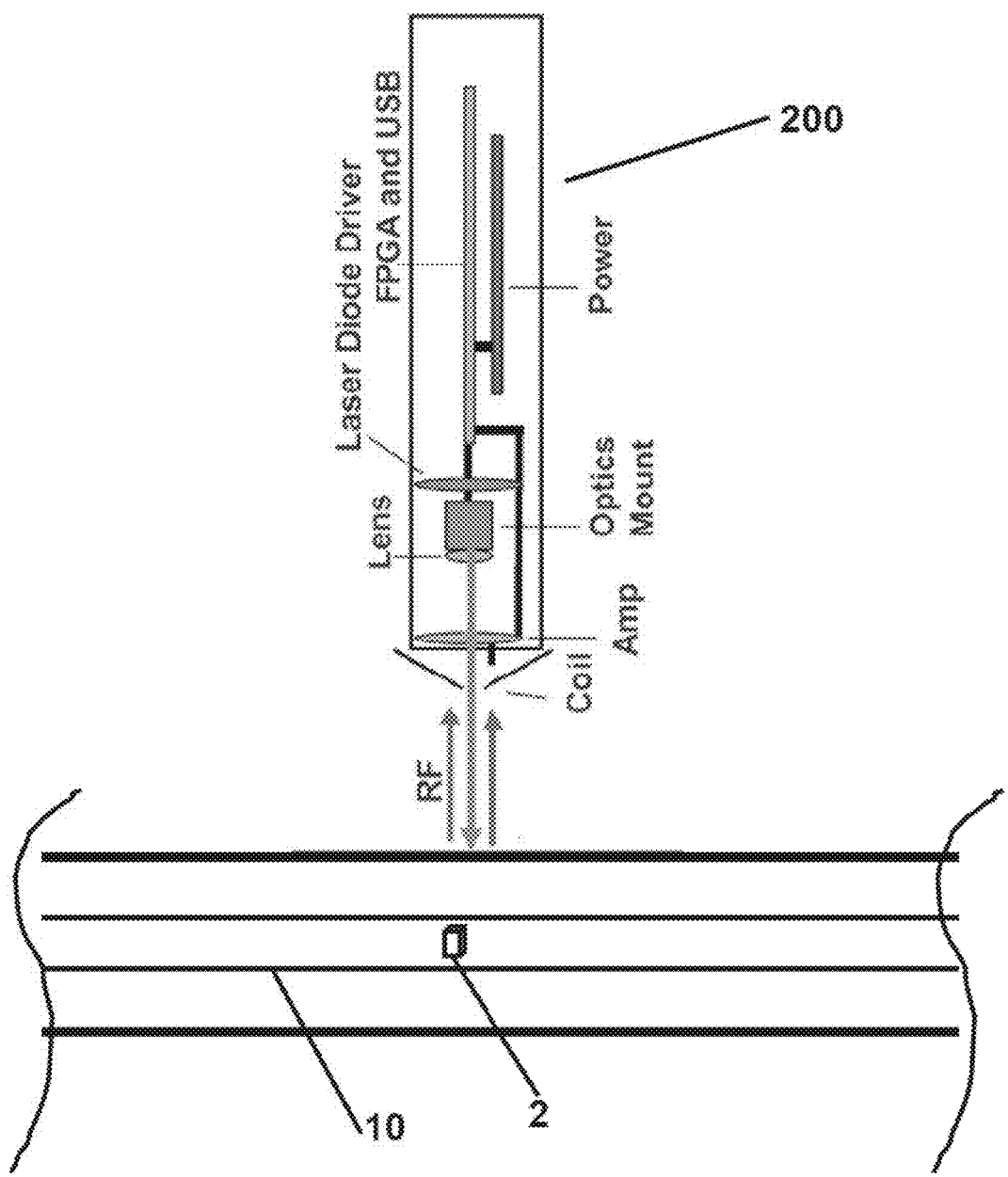
FIG. 3 shows the reading location at the entrance to the sorting manifold shown as 200 in FIG. 2. A p-Chip passing by in the microfluidic channel is illuminated by a closely mounted PharmaSeq Wand (P/N 100224) which recovers the ID of the p-Chip for example within 2 µs.

As illustrated in FIG. 3, it is during passage of a TAB 2 through the initial source channel 10 that the TAB reader 200 is operated. The TAB reader 200 (ID reader) of FIG. 3 is an illustrative MTP reading device that can for example connect to a standard PC and is capable of reading the serial number (ID) of individual TABs. The wand can be, for example, USB-powered and contain a USB 2.0 transceiver microcontroller, a field programmable gate array (FPGA), power converters and regulators, a laser diode with programmable current driver, an optical collimation/focusing module, and a tuned air coil pickup with a high gain, low noise differential RF receiver with hysteretic comparator data slicer. FPGA code in the ID reader can be upgraded to support incorporation of new features and performance enhancements. The wand contains for example a laser, for example emitting an average of 60 mW of optical power at 660 nm. The ID is read when the TAB is placed within suitable proximity of and orientation to the laser light. The light can be, for example, pulsed at 1 MHz; this feature can provide the data clock used by the MTP for synchronization of the transmitted ID data bits. The timing of the pulse groups can be set so that the duty cycles and average power levels fall within requirements for registration as a Class 3R laser device (available on-line at www.iec.ch/cgi-bin/proc-gi.pl/www/iecwww.p?wwwlang=english&wwwprog=cat-det-.p&progdb=db1&wartnum=37864).

The clock signal from the light source can provide the carrier frequency used for emission of the serial ID number; therefore, the MTP reader can house a laser or other light power source. To recover the alternating magnetic field emissions from the MTP (e.g., for RF emitting MTPs), a suitable coil that is made resonant at the operating frequency can be used so as to maximize recovered signal voltage and reject out-of-band emissions and lower noise power in the received signal. A low-noise differential amplifier can provide gain with a high degree of common-mode rejection in order to maximize signal-to-noise ratio; the signal can then proceed for example to a voltage comparator. The binary sliced signal is then applied for example to a parallel processing decode engine realized in a field programmable gate array (FPGA). The decoder applies for example pattern-matching techniques to recognize elements of the incoming bit stream and extract the serial ID value. These signal tokens are then passed along to the host microprocessor, for example via a USB interface, for capture and presentation to the user or for usage by a data processing system that, for example, supervises the assembly of the DNA fragments under software control.

The resulting ID readout from the MTP can be rapid (less than 0.01 sec) and can be reported on for example a personal computer using application-specific software and connected, through software, to inventory database(s) or other data intensive application. One performance parameter of the wand is its read volume; i.e., the space beyond its tip in which the ID can be read. This volume is a function of several variables, including illumination angle, illuminance energy, attenuation factors and tuning of the optical system's focal point. For example, the read volume can be approximately 12 $mm^3$ (8 mm×1.5 mm×1 mm).

Other MTP readers, such as for those MTPs that are triggered by light, and emit a light signal (as discussed herein), can be used (see U.S. Pat. Appn. 61/944,305, filed 25 Feb. 2014, and U.S. patent application Ser. No. 14/631,321, filed 25 Feb. 2015, both incorporated herein by reference in their entirety).

The MTP reader light source can be placed on one side of the channel, with a mirror placed on the other side of the channel, with one or the other offset from perpendicular (light source) and parallel (mirror) relative to the channel. In this way, a MTP with a photosensitive face oriented towards the reader can be triggered without the mirror. But also, a MTP with a photosensitive face oriented away from the reader can receive a trigger via the mirror, and send back a signal by dispersed radio or by light reflected via the mirror. The offset is used to assure that the MTP does not interfere with the light pathway. In some embodiments, the size of the MTP relative to the light pathway can be small enough that the offset is not needed.

TAB readers (e.g., MTP readers) can be placed on both sides of the channel, or multiple TAB readers can be placed with multiple orientations towards the channel. In this way, problems with non-reading of the TAB due to orientation can be minimized.

The flow channel can also be designed such that the manner in which the TAB flows is laminar and cannot flow past the reader in an orthogonal disposition such that thereby a readable edge faces the TAB readers.

TABs bearing Bar Codes can be read using standard methods such as those adapted for high speed inventory control bar code scanners such as the Motorola DS457 series (Motorola Solutions, Schaumburg, Ill.). TABs can be marked with a combination of fluorescent markers, and read optically.

TABs can also be radio triggered RFID chips. Though commercial marketing has discontinued, such RFID chips as small as 300×300 micron (major dimensions) have been made by Hitachi (mu-chip, Hitachi, Ltd., Tokyo). These can be surface passivated to handle the reaction conditions of for example nucleic acid synthesis. With a radio signal query, the signal strength can be kept low so that multiple TABs do not respond. Alternatively, carefully chosen pulse-signaling formats can mitigate this tag collision. Optionally shielding can be used to limit the area of the TAB sorter 100 that will receive triggering RF.

Figure 4:
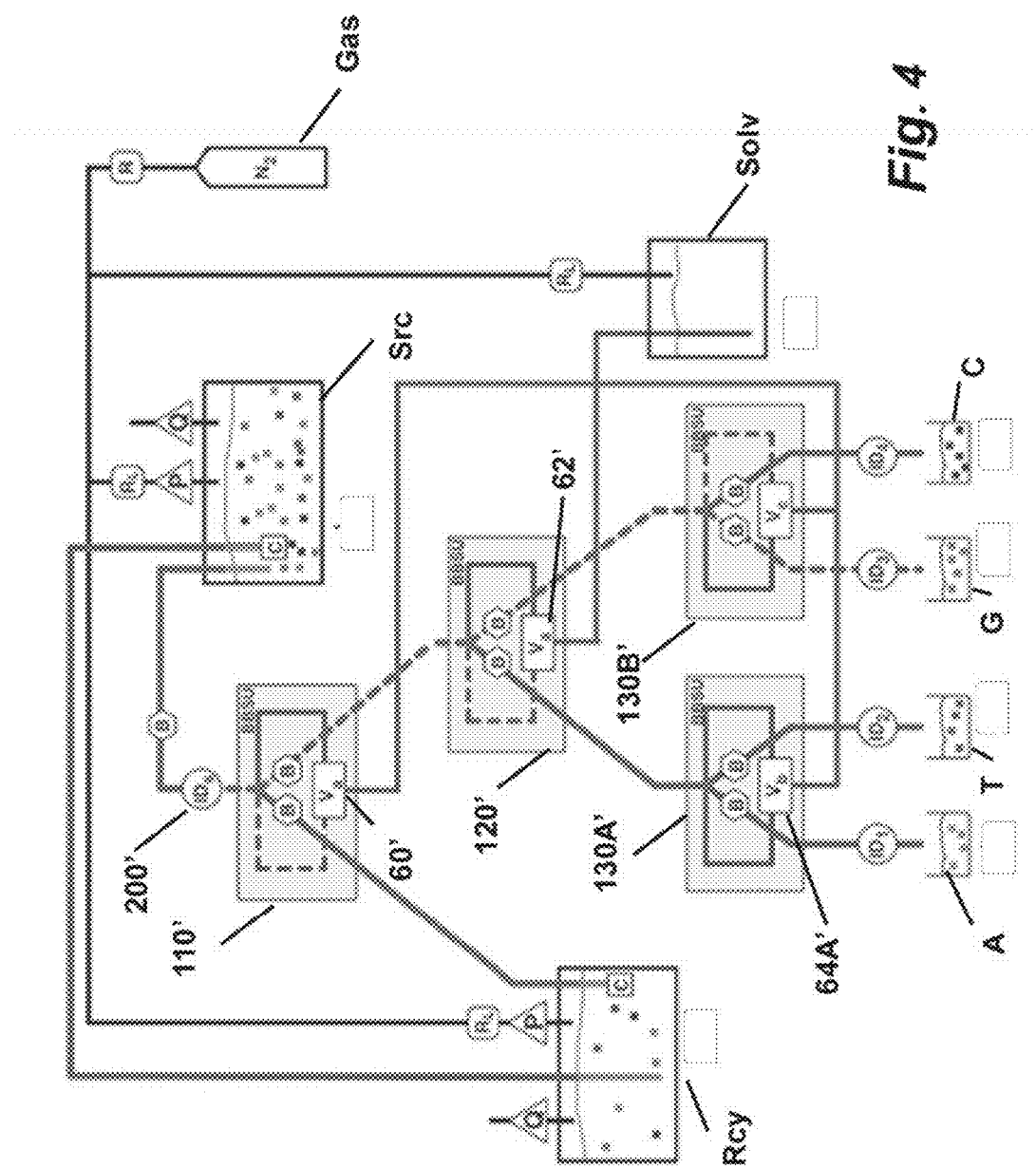
FIG. 4 shows another exemplary sorting manifold (TAB sorter).

As illustrated in FIG. 4, the bypass to one or more sorting chambers Rcy can be at an earlier stage of the sorting process. A later stage can be used, since while a risk of ambiguity can generally be predicted early, this is not always the case. Moreover, an early designation of ambiguity can mean that additional TABs will be so designated. Numbering in this figure correspond to previous numbering, except that certain items are designated with a prime ('), and valves 62', 64A' and 64B' are shown (where in FIG. 2 the valves at these stages are omitted for simplicity). There is TAB source vessel Src, a solvent vessel Solv and a gas container Gas. This embodiment benefits from detection and removal of ambiguous chips early in the process so as to eliminate the need for keeping track of them as they propagate through the sorting tree.

Where automatically controllable valves are used to control the sorting nodes (such as valves 60, 62, 64A', etc.), they should have a fast response time (such as 10 ms or less), and function through many cycles (such as 10 million or more). Example valves include LVM115-5A-2 and LVM115-6A-2 from SMC Corporation (Yorba Linda, Calif.). (For illustration purposes, 2-way valves are shown. In many embodiments, valving will be as shown in FIG. 2 (one way valves).)

As further illustrated in FIG. 2, in addition to TAB reader 200, there can be TAB readers at later stages (such as TAB readers 202A and 202B). There can be further TAB readers at stage 3, or even later stages if present. These additional TAB readers can identify TABs that were too close earlier in the process for definitive identification.

In embodiments, the tumbling flow of the TABs should assure that the triggering light signal should have access to the readable surface of the TAB (e.g., the light-receptive surface of the MTP) for a time adequate to produce at least one whole signal frame (in embodiments, 512 microseconds). With TABs that are light in/light out MTPs (all optical MTPs, or "OMTPs"), the speed of response should assure that the alignment of the triggering light with the OMTP will assure sufficient alignment of the outgoing light signal (with the emitting and receiving elements of the OMTP reader generally aligned, such as by using absorptive and reflective optics, and the like). Should additional tumbling action need to be induced, source channel 10 can be designed with a flow pattern configured to enhance tumbling, for example by introduction of turbulence to the flow channel.

In embodiments, at TAB reader 200 the source channel 10 narrows in one dimension to less than the width of the TAB, optionally widening in the second dimension to compensate for flow. Thus, the orientation of the TAB as facing sufficiently towards one of two TAB readers (or one TAB reader and a mirror) is assured.

Figure 5:
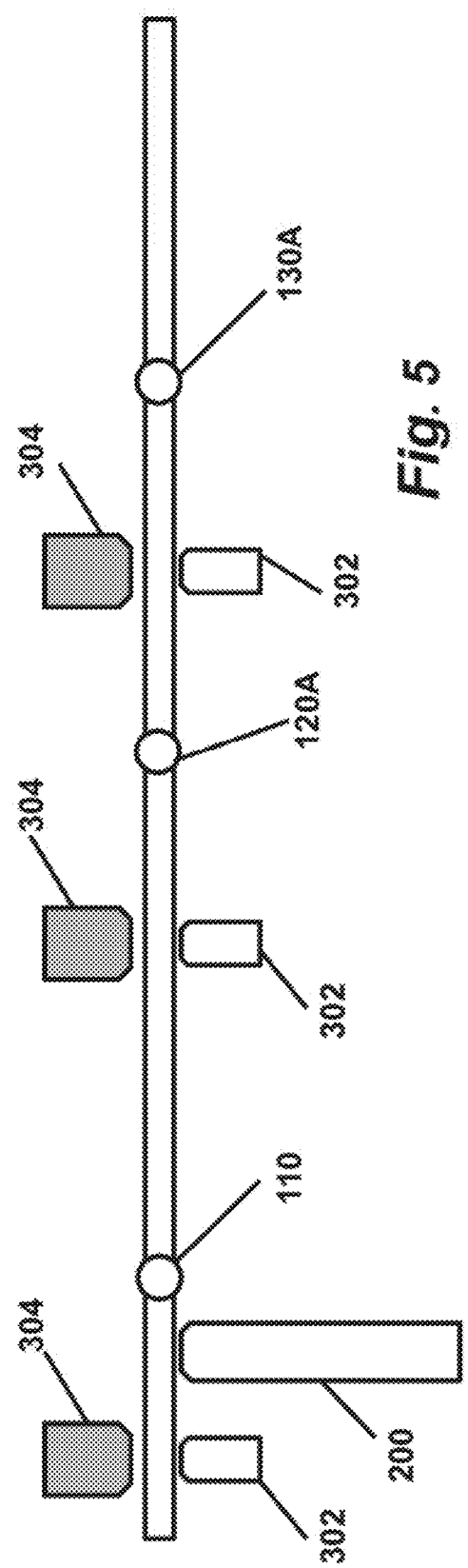
FIG. 5 show an illustrative side view of a TAB sorter of FIG. 2.

FIG. 5 views the device of FIG. 2 from the side, following the track of one sorting pathway, namely that shown on the left side of FIG. 2. Shown are light sources 302 (e.g., diodes, such as infrared LEDs) and light detectors 304 (such as photodiodes), which comprise an embodiment of the monitor (of TAB location). Laser diodes and lens can be used to narrow the emitted light beam, with the detector coverage similarly narrowed. Or, a narrow detector coverage can be used (e.g., a slit to cover all of the width of the channel). Blocking events, or drops in light detection, indicate the passage of TABs. If the drops are too close (per a threshold set, empirically determined, or dynamically determined by the controller), then the TABs may be designated for re-sorting (distribution to sorting chamber Rcy). In certain embodiments, there can be designation of a TAB for discard. The light sources and light detectors can be on the same side, such as where a mirror is used on the other side, or incorporated into the channel structure.

Additional light sources and detectors can be placed, such as just after sorting node locations. A location just after a sorting node can identify TABs that were previously separated, but have moved close together such that individual IDs are more difficult to resolve. Such structures can also, for example, verify success of a sort action and help to track TABs through the fluidic network.

Figure 6:
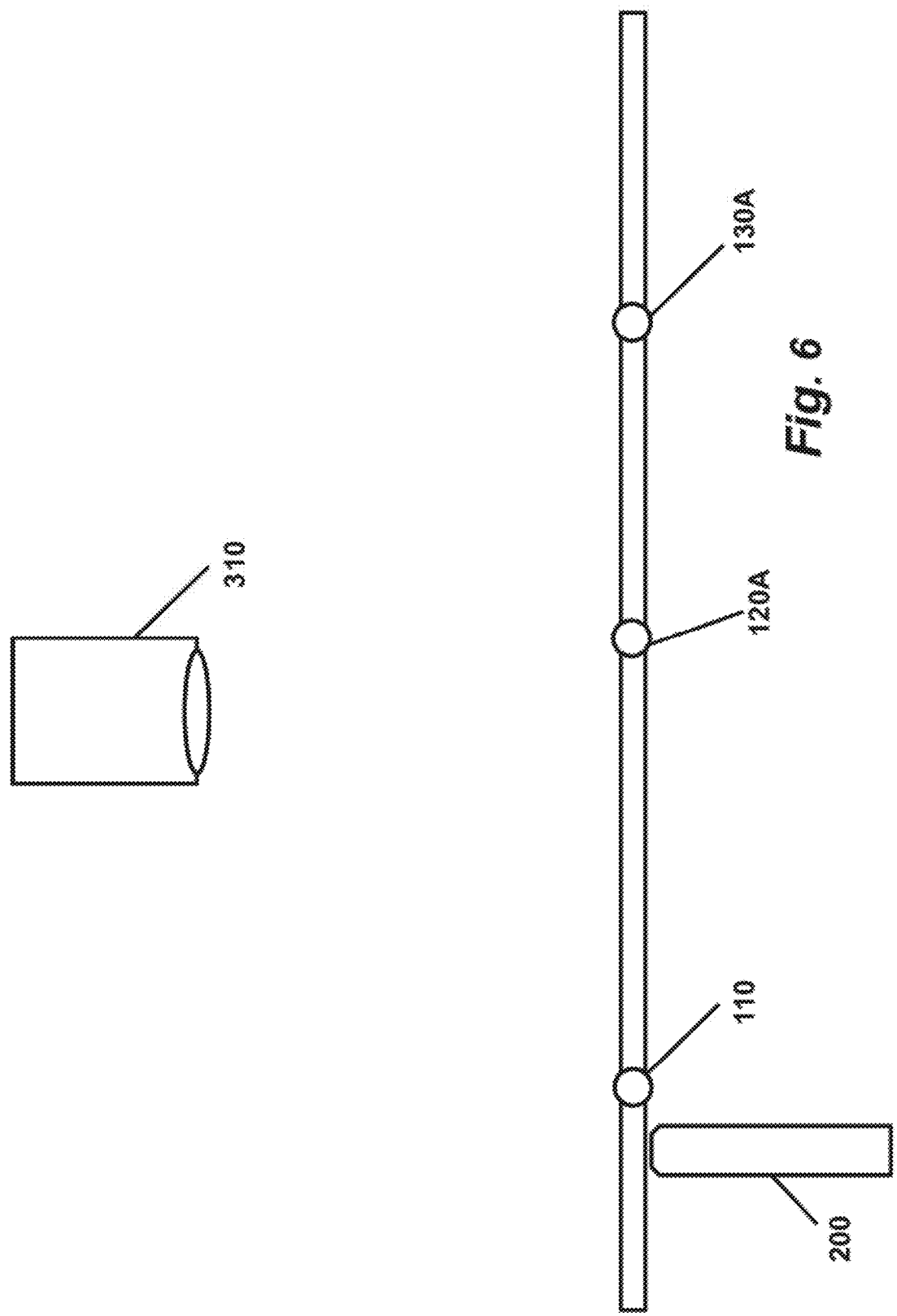
FIG. 6 show an illustrative side view of a TAB sorter of FIG. 2.

As illustrated in FIG. 6, TAB movement can be monitored with a high speed camera 310, such as one providing 1,000 frames per second (e.g., at 1280×1024 pixel resolution). With optical methods as outlined above, appropriate portions of the TAB sorter 100 should be transparent or translucent to the wavelengths of light used for illumination of the TABs. Other methods of detecting the spacing of TABs can be used, such as for example acoustical.

Combinatorial Synthesizer

Figure 7:
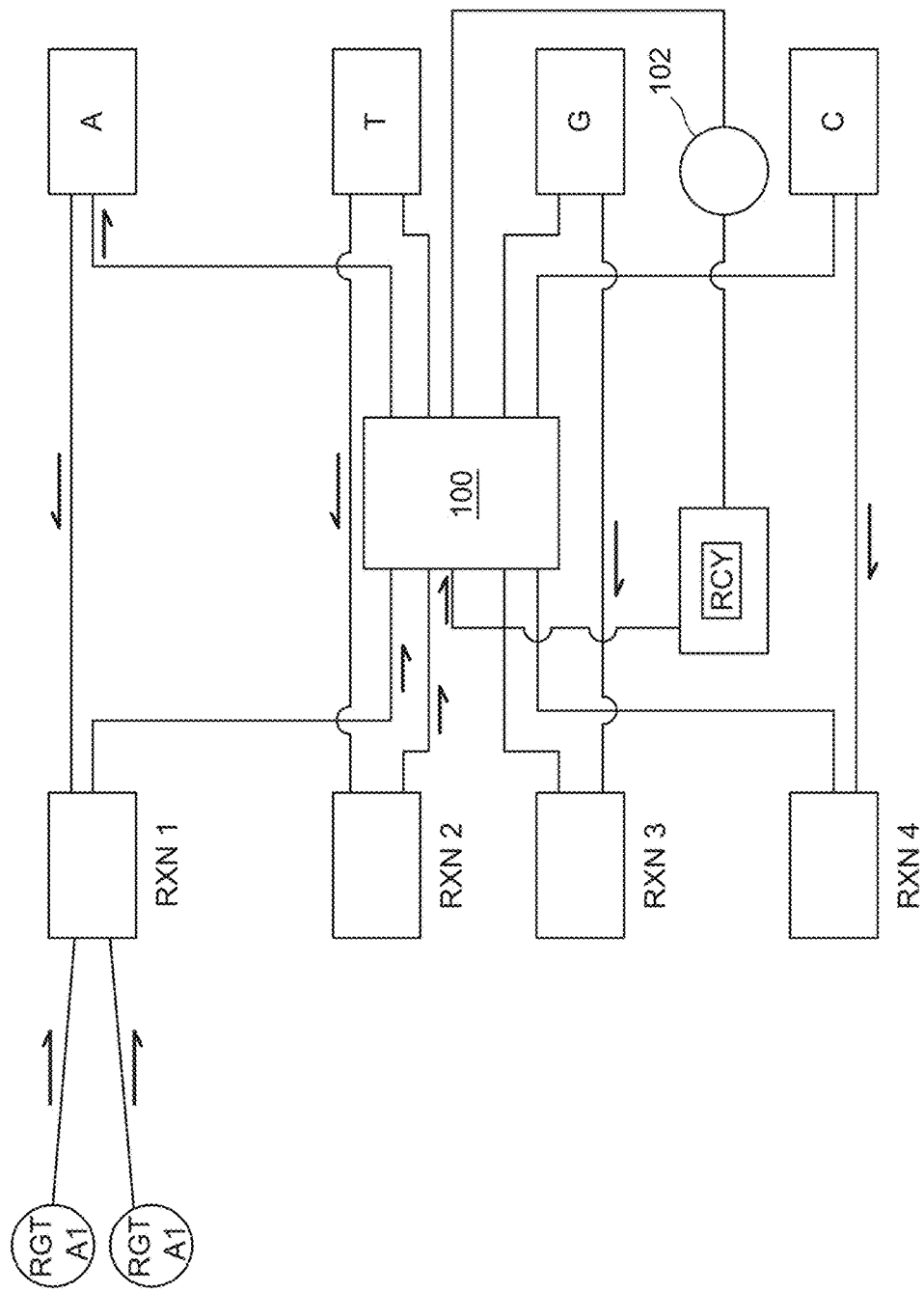
FIG. 7 shows an illustrative combinatorial synthesizer.

FIG. 7 shows a combinatorial synthesizer with reaction chambers Rxn1, Rxn2, Rxn3 and Rxn4. For Rxn1, two source reagent vessels, Rgt A1 and Rgt A2 are shown. The number of reagent source vessels connectable to a given reaction chamber will vary with the type of combinatorial chemistry contemplated. Automated valves can be used to activate flows along the various illustrated flow pathways as needed in view of a predetermined synthesis protocol. Since an individual TAB is to be followed and routed throughout the synthesis protocol, it can have a predetermined combinatorial order of added reagents. After a round of synthesis, the TABs are distributed by TAB sorter 100 to the sorting chambers, and then returned to the appropriate reaction chamber for the next synthesis round. Indeterminate TABs can be re-routed to sorting chamber Rcy for resorting. Optionally, there is a sorting stage for discarding TABs for which there has been a synthesis error (e.g., a missed reaction step). This is illustrated with a second TAB sorter 102, but the sorting can be incorporated into TAB sorter 100.

In embodiments, the sorting chambers A, T, G and C are structurally the same as reaction vessels, and have quick release fittings for liquid or gas flow channels. As such, for example, after sorting, sorting chamber A can be physically moved (e.g., robotically) to the position of reaction chamber Rxn1. Thus, a liquid fluid channel from each sorting channel to the corresponding reaction chamber is not needed. The substituted reaction chamber can be moved to a sorting chamber slot, or to a rinsing station.

Figure 8:
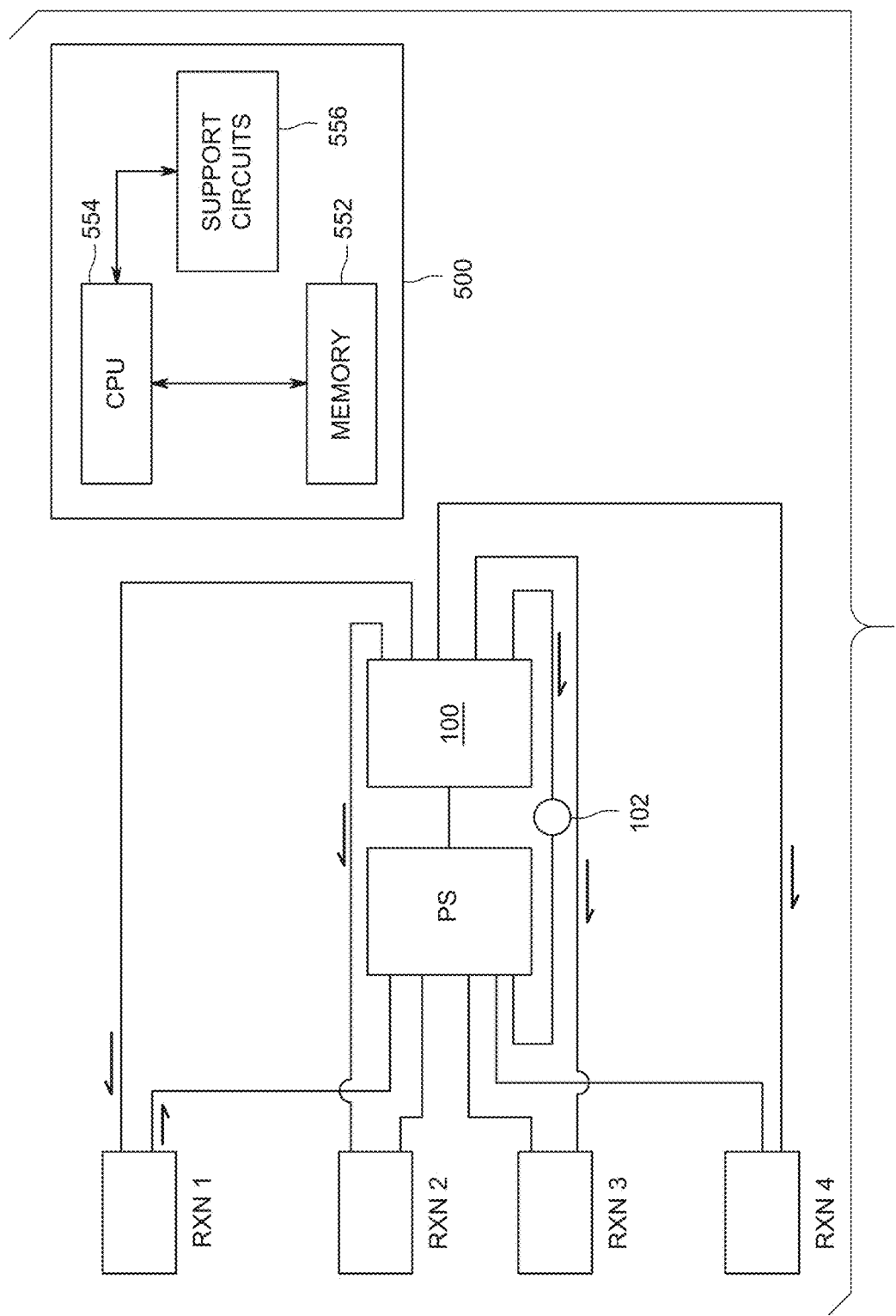
FIG. 8 shows another illustrative combinatorial synthesizer.

FIG. 8 shows a variation wherein the reaction chambers serve as the sorting chambers. Since the timing of sorting will generally be such that the reaction chambers will not yet be empty when one seeks to re-fill them independent of how they were first filled, one or more pre-sort chambers PS are needed. As illustrated, chamber PS is a RCY chamber.

Figure 9:
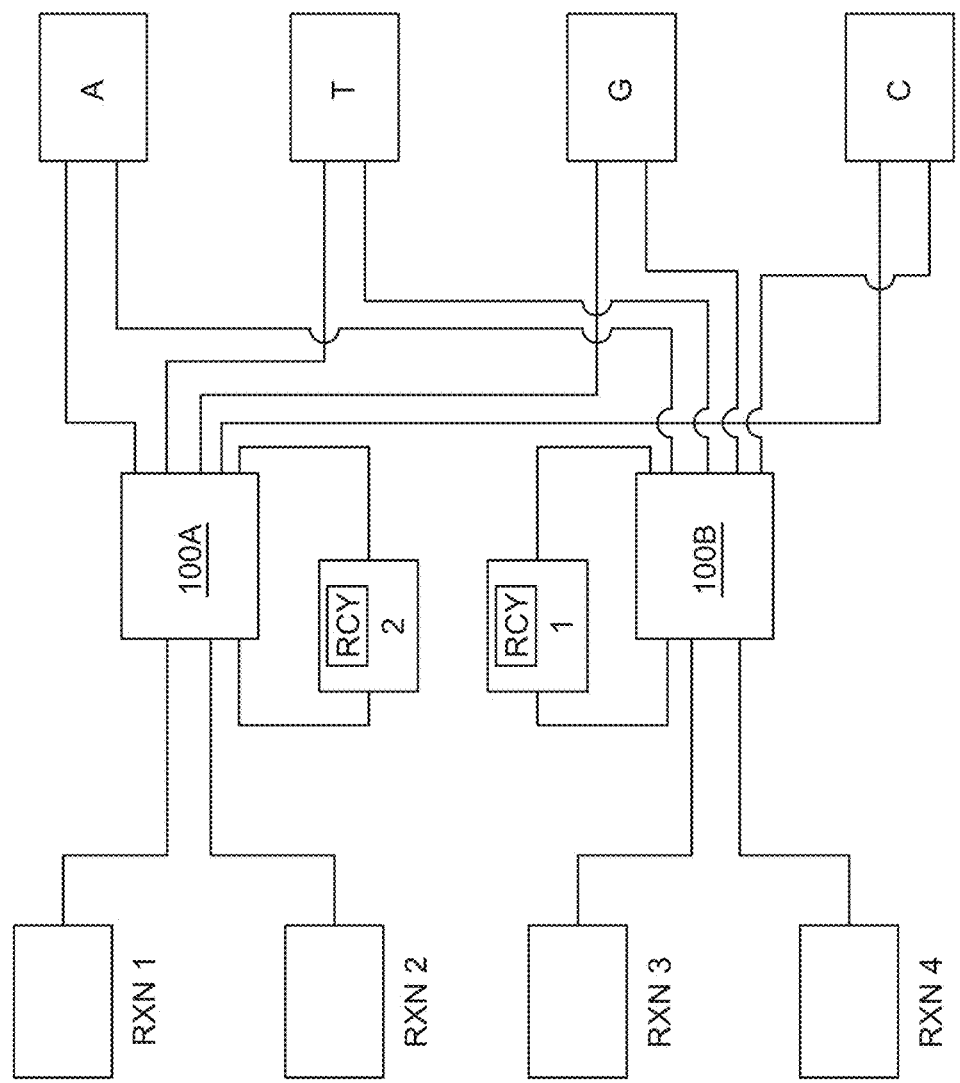
FIG. 9 shows another illustrative combinatorial synthesizer.

In the combinatorial synthesizer of FIG. 9, two TAB sorters are used (100A, 100B).

Controller

The synthesizer has controller 500 (illustrated in FIG. 8), which can comprise a central processing unit (CPU) 554, a memory 552, and support circuits 556 for the CPU 554 and is coupled to and controls the synthesizer or, alternatively, operates to do so in conjunction with computers (or controllers) connected to the synthesizer. CPU 554 may be realized as a general purpose CISC, RISC or other traditional microprocessor architecture, or it may be realized as a FPGA.

For example, another electronic device can supply software, or operations may be calculated off-site with controller 500 coordinating off-site operations with the local environment. The controller 500 may be one of any form of general-purpose computer processor, state machine, or an array of processors, that can be used for controlling various devices and sub-processors. The memory, or computer-readable medium, 552 of the CPU 54 may be one or more of readily available memory technologies such as random access memory (RAM), read only memory (ROM), flash memory, floppy disk, hard disk, ReRAM, magnetic memory, or any other form of digital storage, local or remote. The support circuits 556 are coupled to the CPU 554 for supporting the processor in a conventional manner. These circuits can include cache, power supplies, clock circuits, address decoders, input/output circuitry and subsystems, and the like. Methods of operating the synthesizer may be stored in the memory 552 as software code that may be executed or invoked to control the operation of the synthesizer. The software may also be stored and/or executed by a second CPU (not shown) that is remotely located from the hardware being controlled by the CPU 554. While the above discussion may speak of the "controller" taking certain actions, it will be recognized that it may take such action in conjunction with connected devices.

Though not illustrated, the controller, or controller subparts, are operatively connected to the valves and switches in the TAB sorters 100 and 102, to valves or pumps that move fluids from a reaction chamber to a TAB sorter or Pre-sort chamber, or from a sorting chamber to a reaction chamber, or from an RCY chamber to a TAB sorter. Moreover, the controller, or controller subparts, are operatively connected to the TAB readers and monitors of the synthesizer. Further, the controller, or controller subparts, can be operatively connected to pressure sensors, pumps, valves, flow sensors, and the like in the synthesizer.

The controller can be programmable to track a separate reaction sequence to $10^4$ or more TABs, or $10^5$ or more TABs, or $10^6$ or more TABs, or $10^7$ or more TABs. The separate sequences may be assigned by the controller, or inputted into the controller.

Programming

At the beginning of a synthesis, all of the TAB IDs are known, for example as a product of the production method. Programming for use with the sequencer assigns a reaction sequence for each TAB, with the sequence appropriate for the input reagents and reactors configured with the synthesizer. The sequences can be assigned to provide a representation of the sequences of a segment of genomic nucleic acid. Or, for example, the sequences can be selected to identify an array of mutations for a given gene.

As such, if a TAB is identified by the TAB reader, the programming will direct how each sorting node in its path will be operated when it enters. If the monitor shows anomalies in the TAB's path through the TAB sorter, the programming operates to have the appropriate sorting node move the TAB to an RCY sorting chamber.

In one embodiment, TABs that cannot be positively identified at the first sort node are routed to the recycle vial where they rejoin the pool of TABs awaiting sorting.

In yet another embodiment, TABs that are not identified at the initial reading upon entry to the fluidic network are neutrally routed through to the stage where the recycle option of the output sort node is selected, depositing that TAB into the recycle vial to be optionally sorted again.

In some embodiments, the controller tracks TABs for which the synthesis sequence has had an error. For example, the TAB is counted coming out of the wrong reaction vessel for its ordained synthesis sequence. In this case the apparatus can have a mechanism to discard such a TAB, or a post-synthesis sorting can discard the errant TAB. A smaller scaled synthesis can be conducted to replace the erroneous TABs.

Multiplexing

While the invention is illustrated with a TAB sorter having one sorting tree, it is anticipated that when modeling highly complex genomes, for example, multiple sorting trees can be utilized. These can include one or more sorting trees per reaction vessel, and one or more sorting trees per RCY vessel (where for example the recycle outlet can feed back to the RCY vessel).

TABs that are Light-Activated MTPs

MTPs are generally sided, in that the photocell and operative circuitry is formed on one face, and the other major face is generally bare silicon—and can be a product of height reduction by back grinding. The circuitry face is generally protected by a passivation layer, such as of silicon dioxide, silicon nitride or mixtures, or multiple such layers.

As described in "All Optical Identification and Sensor System . . . ," U.S. Pat. Appn. 61/944,305, filed 25 Feb. 2014, the trigger and powering signals as well as the output signals can be optical. With this innovation, it is yet more practical to construct a small MTP, such as 50×50×10 micron.

Reactive Surfaces

TABs are generally constructed of a material that is relatively inert to the proposed chemistries, such as chemistries of polynucleotide synthesis. To provide a surface amenable to linking the reactants of the combinatorial synthesis, surfaces such as silicon can be modified for example as outlined in U.S. Pat. No. 8,785,352. While these methods are very effective, they generally do not achieve the density of reaction sites as can be achieved with controlled pore glass (CPG) commonly used for DNA synthesis. Attaching a thin wafer-like (e.g., 5 micron) CPG element to the TAB can be done with standard wafer-bond techniques. As such, the capacity of a 500×500 micron surface can be for example 10 pM, and 100 fM for a 50×50 micron surface.

Reactive Chemistries

Generally, for nucleic acid synthesis, well-established synthesis protocols (e.g., phosphoramidite methods) are utilized. The initial linkage to the TAB can be chosen depending on whether the final product remains on the TAB (e.g., for hybridization, or sold-supported PCR reactions). As is well understood, the initial linkage can be selected to survive the deprotection step. If the linkage is selected to provide a free polynucleotide, deprotection can be conducted in the liquid phase.

For polypeptide synthesis, acid or base labile alpha amino acid protecting groups can be used. Typically, in each addition step, activated acids are added to a nucleophile on the TAB. Again, the initial linkage can be selected based on whether the polypeptide will remain on the TAB, or be release (such as in a final HF deprotection step).

Other combinatorial chemistries are known in the art.

Sequence fidelity can be checked for given TABs by nucleic acid or protein sequencing. Alternatively, and applicable to other combinatorial chemistries, electrospray mass spectrometry (ES MS) or matrix-assisted laser desorption/ionization time-of-flight mass spectrometry (MALDI-TOF) can be used.

Double Stranded Nucleic Acid Synthesis

By overlapping oligonucleotides "defining" the sequence of the double stranded nucleic acid, it is meant that the sequence is defined by the properly annealed oligonucleotides, where missing segments on one strand or the other can be deduced by base-pairing.

Where the synthetic method has produced overlapping oligonucleotides defining a given double stranded nucleic acid, the appropriate pool of TABs is treated to release the oligonucleotides. Then, the oligonucleotides are annealed, and enzymatically filled in as needed. The filling in can be conducted in conjunction with annealing into a restriction site of a plasmid or virus, and the result amplified by cloning into an organism.

Light Sources for Monitors or TAB Readers

The light can for example be from a laser, laser diode, LED, optical fiber, light aimed by a parabolic mirror, and the like. The light source can be broad spectrum or narrow spectrum, or a combination of two or more narrow spectrum beams. For example, the ID and the analytical signal may be generated by the same band of light or by separate bands such that the collimated light is engineered to carry both.

Preferred Reaction Vessels

A set of Parker-Hannifin 009-0347-900 or similar (e.g., 0.020" orifice) solenoid valves can arranged on a heavy base to attenuate audio-frequency vibrations from valve actuations. This base is securely mounted to the heavy breadboard and incorporates rubber shock mounts to further attenuate propagation of vibrations. Mitigation of vibrations is useful to minimize blurring camera images used to track TAB motion.

In embodiments, it is anticipated that the volumetric ratio of solvent to TAB can be about 80:1. Thus, for example, with 500×500×100 micron TABs, there can be by this about 500 TABs per mL. With this solvent ratio, with 50×50×10 micron TABs, there can be about 50,000 TABs per mL.

The reaction vessel and other features of the synthesizer can be constructed taking into account that solvents commonly used in for example nucleic acid synthesis will be used.

To held keep TABs in suspension, the viscosity of the suspending solvent can be modified, such as with gellan gum.

MTP Features

Conventional, passive RFID tags harvest power from the driving RF signal using antenna coils that are typically many centimeters in diameter. This setup results in up to approximately 1% efficiency of power transfer to the RFID device. In the case of those RFID methods that do not use such a large external antenna (such as the Hitachi mu-chip, now withdrawn from the market), the antenna efficiency drops by orders of magnitude, severely curtailing range and efficacy. Light energy harvested by photodiodes in the MTPs results in up to 10% efficiency in power transfer owing to the focused nature of the optical energy delivery as opposed to than the broadcast nature of RF. Thus, because light-powered MTPs use energy more efficiently, they can achieve greater transmission ranges for the given small antenna size relative to purely RFID-based approaches. No other solution is smaller and more energy efficient.

Further, the method of powering each MTP by a tightly focused light beam (e.g., laser) allows specificity of physical addressing, i.e., addressing a dense array of tags in close proximity one tag at a time. Using traditional RFID methods, multiple tags in close proximity will attempt to communicate simultaneously, mutually interfering with one another and preventing reading of the tags. This phenomenon is known as "RFID tag collision." An RF signal is only emitted from MTPs that are activated by the laser allowing precise positional specificity.

Since triggering the MTP is alignment dependent, and thus specific, it is very well suited for use in the current invention.

Stripping

TABs can be stripped of previous surface chemistries for re-use.

All ranges recited herein include ranges therebetween, and can be inclusive or exclusive of the endpoints. Optional included ranges are from integer values therebetween (or inclusive of one original endpoint), at the order of magnitude recited or the next smaller order of magnitude. For example, if the lower range value is 0.2, optional included endpoints can be 0.3, 0.4, . . . 1.1, 1.2, and the like, as well as 1, 2, 3 and the like; if the higher range is 8, optional included endpoints can be 7, 6, and the like, as well as 7.9, 7.8, and the like. One-sided boundaries, such as 3 or more, similarly include consistent boundaries (or ranges) starting at integer values at the recited order of magnitude or one lower. For example, 3 or more includes 4 or more, or 3.1 or more.

Example 1: Stability

MTPs were tested for stability of the RF transmitting functions when exposed to various aqueous solutions and solvents: (a) acidic solutions: strong, medium and weak acids (20% $H_2SO_4$, 25% $H_3PO4$, AcOH [glacial acetic acid]); (b) basic solutions: strong and weak (10% NaOH, conc. $NH_4OH$, saturated $NaHCO_3$); (c) oxidizer ("piranha" solution); (d) $NH_4F$; (e) organic solvents: acetonitrile, DMF, DMSO, methanol, ethanol, pyridine, DCM, chloroform and toluene. The results show that MTPs are very stable in most aqueous solutions (halflife>4 days) and moderately stable in basic solutions (half-life about 1 day). MTPs are very stable in all organic solvents tested, and after a 15-day exposure 80-100% of the chips maintained their RF performance.

In addition, MTPs have excellent temperature stability: they can be incubated at up to 520° C. for 8 h and still show full RF activity (sample size: 100 MTPs, all of which were fully active at the end of incubation). MTPs have a lifetime of many years at room temperature (RT) or lower temperature (−20° C. and −80° C. were tested). In addition, MTPs are not affected by centrifugation (15 min in microcentrifuge at about 15,000 g), 1 hour exposure to microwave radiation (standard 700 W microwave oven was used for testing) or autoclaving (in water, a total of 15 repeats of the complete autoclave cycles were tested).

Example 2: Nucleic Acid Synthesis

The suitability of MTPs for oligonucleotide synthesis has been proven through successful syntheses of over 150 different sequences that were made on a total of more than 20,000 MTPs. The syntheses were performed using high-throughput robotic DNA synthesizers. The full functionality of the synthetic oligos made on MTPs was demonstrated.

The performance, measured as the fluorescence signal strength in a hybridization assay, was on par with or better than the performance of synthetic oligos conventionally made by a supplier and conjugated to MTPs.

TABs with comparable surface chemistries are used in the same test.

Example 3: Peptide Synthesis

A combinatorial library of 8 amino acid long peptides was synthesized on 5,000 p-Chips. Eight different amino acids were allowed in four positions. The library was screened against a hemagglutinin antibody (Ab) (Sigma-Aldrich). The analysis performed on Simuplex analyzer [PharmaSeq, Monmouth Jcn., N.J.] demonstrated different binding activity of different peptides. A consensus binding sequence was determined and shown to be related to the sequence of the peptide known to bind to the HA Ab.

TABs with comparable surface chemistries are used in the same test.

The invention is further described in the Appendix to the priority provisional application, which is incorporated herein in its entirety.

Publications and references, including but not limited to patents and patent applications, cited in this specification are herein incorporated by reference in their entirety in the entire portion cited as if each individual publication or reference were specifically and individually indicated to be incorporated by reference herein as being fully set forth. Any patent application to which this application claims priority is also incorporated by reference herein in the manner described above for publications and references.

While the foregoing is directed to embodiments of the present invention, other and further embodiments of the invention may be devised without departing from the basic scope thereof, and the scope thereof is determined by the claims that follow. Any claim below that is written as dependent on an independent claim can also be written as dependent on any of the claims under such independent claim, except where logic forecloses such a dependency.

What is claimed is:

1. A combinatorial synthesizer comprising:
    four or more reaction vessels configured to react a separate combinatorial building block with a moiety on a surface of a TAB;
    one or more TAB sorters comprising a TAB reader, a sorting tree comprising valves or switches and sorting nodes, wherein the TAB sorter sorts to outlets that number more than the number of reaction vessels, and a monitor configured to detect TAB location, wherein the TAB reader is configured to read TABs in the TAB sorter, wherein the TAB sorter has outlets at least matching the number of reaction chambers plus one;
    one or more recycle (RCY) sorting chambers for ambiguously ID'd TABS, such chambers configured to receive such TABs from one or more outlets of the TAB sorter, with a given RCY sorting chamber configured to direct ambiguously ID'd TABs back to an inlet of a said TAB sorter; and
    a controller (i) programmable to track an assigned separate reaction sequences for $10^4$ or more TABs, (ii) operatively connected to receive ID data from the TAB reader, (iii) operatively connected to the valves or switches to sort the TAB consistent with the TAB's ID, (iv) operatively connected to receive TAB location data from the monitor, (v) configured to identify TAB's with ambiguous IDs, (vi) configured to operate the valves or switches of the TAB sorter to direct ambiguously ID'd TABs to such a RCY sorting chamber, and (vii) configured to operate the valves or switches of the TAB sorter to direct an ID'd TAB to a TAB sorter outlet appropriate for its assigned reaction sequence,
    wherein the combinatorial synthesizer is configured to direct via the outlets the TABs to the reaction chamber appropriate for the next reaction in the TAB's assigned reaction sequence.

2. The synthesizer of claim 1, wherein the monitors of the TAB sorters comprise a high speed cameras.

3. The synthesizer of claim 1, sorting nodes numbering equal to or greater than the number of reaction vessels are present at a stage 3 or further in the respective sorting tree of a given TAB sorter, with these nodes operative to sort to the one or more RCY sorting chambers.

4. The synthesizer of claim 3, wherein the monitors of the TAB sorters comprise a high speed cameras.

5. The synthesizer of claim 1, wherein the RCY sorting chambers number as many or more than the number of reaction vessels, and wherein that number of sorting nodes are present at a stage 3 or further in the respective sorting tree of a given TAB sorter, with these nodes operative to sort to the RCY sorting chambers.

6. The synthesizer of claim 5, wherein the monitors of the TAB sorters comprise a high speed cameras.

7. A method of combinatorial synthesis utilizing the combinatorial synthesizer of claim 1 comprising:
    assigning or providing separate reaction sequences for $10^4$ or more TABs;
    utilizing the four or more reaction vessels configured to react a separate combinatorial building block with a moiety on a surface of a TAB; and
    operating the one or more TAB sorters,
    wherein the operating comprises serially conducting:
    (a) reacting four or more distinct combinatorial building blocks in the reaction chambers with surfaces of $10^4$ or more TABs distributed in the reaction chambers;
    (b) operating a controller to operate the TAB sorters to segregate the TABs to allocations appropriate for the next assigned reaction, the operating including recycling TABs with ambiguous identity back through the sorter; and
    (c) repeating steps (a) and (b) as needed to complete 30% or more of the assigned sequences.

8. The method of claim 7, wherein the monitors of the operated TAB sorters comprise high speed cameras.

9. The method of claim 7, wherein the operated TAB sorters have a number of sorting nodes equal or greater than the number of reaction vessels present at a stage 3 or further in the respective sorting tree, and these nodes are operative to sort TABS to with ambiguous identity for recycling back through the sorter.

10. The method of claim 9, wherein the monitors of the operated TAB sorters comprise high speed cameras.

11. A method of double stranded nucleic acid synthesis comprising:
    synthesizing overlapping oligonucleotides defining the sequence of the double stranded nucleic acid with the method of claim 7;
    removing the overlapping oligonucleotides from the TABs; and
    annealing the overlapping oligonucleotides and enzymatically filling in resulting single-stranded regions.

12. The method of claim 11, wherein the monitors of the operated TAB sorters comprise high speed cameras.

13. The method of claim 11, wherein the operated TAB sorters have a number of sorting nodes equal or greater than the number of reaction vessels present at a stage 3 or further in the respective sorting tree, and these nodes are operative to sort TABS with ambiguous identity for recycling back through the sorter.

14. The method of claim 13, wherein the monitors of the operated TAB sorters comprise high speed cameras.

15. A sorter comprising:
one or more TAB sorters comprising a TAB reader, a sorting tree comprising valves or switches and sorting nodes, wherein the TAB sorter sorts to outlets that number five or more, of which four or more are separate sorting outlets, and a monitor configured to detect TAB location, wherein the TAB reader is configured to read a TAB in the TAB sorter;
one or more RCY sorting chambers for ambiguously ID'd TABs, such chambers configured to receive such TABs from one or more outlets of the TAB sorter, with a given RCY sorting chamber configured to direct ambiguously ID'd TABs back to an inlet of a said TAB sorter; and
a controller (i) programmable to track sorting requirements for $10^4$ or more TABs, (ii) operatively connected to receive ID data from the TAB reader, (iii) operatively connected to the valves or switches to sort the TAB consistent with the TAB's ID, (iv) operatively connected to receive TAB location data from the monitor, (v) configured to identify TAB's with ambiguous IDs, (vi) configured to operate the valves or switches of the TAB sorter to direct ambiguously ID'd TABs to such a RCY sorting chamber, and (vii) configured to operate the valves or switches of the TAB sorter to direct an ID'd TAB to a sorting outlet appropriate for its ID.

16. The sorter of claim 15, wherein the monitors of the TAB sorters comprise high speed cameras.

17. The sorter of claim 15, sorting nodes numbering equal to or greater than the number of sorting outlets are present at a stage 3 or further in the respective sorting tree of a given TAB sorter, with these nodes operative to sort to the one or more RCY sorting chambers.

18. The sorter of claim 17, wherein the monitors of the TAB sorters comprise high speed cameras.

19. The sorter of claim 15, wherein the RCY sorting chambers number as many or more than the number of sorting outlets, and wherein that number of sorting nodes are present at a stage 3 or further in the respective sorting tree of a given TAB sorter, with these nodes operative to sort to the RCY sorting chambers.

20. The sorter of claim 19, wherein the monitors of the TAB sorters comprise high speed cameras.

21. The synthesizer of claim 1, wherein the TABs comprise light-triggered microtransponders.

22. The synthesizer of claim 1, wherein the TABs comprise semiconductor slabs with etched barcodes.

* * * * *